United States Patent [19]

Usui et al.

[11] Patent Number: 5,049,206
[45] Date of Patent: Sep. 17, 1991

[54] METAL-MADE CARRIER BODY FOR EXHAUST GAS CLEANING CATALYST AND PRODUCTION OF THE CARRIER BODY

[75] Inventors: Masayoshi Usui; Haruo Serizawa, both of Shizuoka, Japan

[73] Assignee: Usui Kokusai Sangyo Kabushiki Kaisha, Japan

[21] Appl. No.: 602,902

[22] Filed: Oct. 24, 1990

Related U.S. Application Data

[63] Continuation of Ser. No. 376,053, Jul. 6, 1989, abandoned.

[30] Foreign Application Priority Data

Jul. 6, 1988 [JP] Japan ............... 63-166837

[51] Int. Cl.$^5$ ............ C23C 10/00; B01J 32/00; B01J 35/04
[52] U.S. Cl. ............... 148/127; 427/383.9; 428/941
[58] Field of Search ............... 428/593, 685, 610, 683, 428/941, 682; 427/383.9, 405, 431; 204/37.1; 502/439, 527; 148/127, 13, 13.1

[56] References Cited

U.S. PATENT DOCUMENTS

| | | | |
|---|---|---|---|
| 2,402,834 | 6/1946 | Nachtman | 428/941 |
| 3,141,744 | 7/1964 | Couch | 428/941 |
| 3,762,884 | 10/1973 | Grisaff et al. | 428/610 |
| 3,898,052 | 8/1975 | Dean et al. | 428/941 |
| 3,907,611 | 9/1975 | Sasame et al. | 428/610 |
| 4,150,178 | 4/1979 | Yagi et al. | 427/431 |
| 4,241,147 | 12/1980 | Boldi | 427/405 |
| 4,247,422 | 1/1981 | Davies | 502/527 |
| 4,384,422 | 7/1983 | Van Thyne et al. | 428/610 |
| 4,414,023 | 11/1983 | Aggen et al. | 75/124 |
| 4,602,001 | 7/1986 | Cyron | 502/439 |
| 4,737,381 | 4/1988 | Kilbane et al. | 427/383.9 |
| 4,752,599 | 6/1988 | Nakamura et al. | 502/527 |
| 4,837,091 | 6/1989 | Nickola | 427/383.9 |
| 4,853,360 | 8/1989 | Hitachi | 502/439 |
| 4,857,500 | 8/1989 | Hitachi et al. | 502/439 |
| 4,867,811 | 9/1989 | Wakiyama et al. | 427/431 |

FOREIGN PATENT DOCUMENTS

| | | | |
|---|---|---|---|
| 283910 | 9/1988 | European Pat. Off. | 502/439 |
| 56-69368 | 6/1981 | Japan | 427/383.9 |
| 62-250949 | 10/1987 | Japan | 502/439 |
| 62-250950 | 10/1987 | Japan | 502/439 |
| 1089167 | 4/1984 | U.S.S.R. | 427/383.9 |

OTHER PUBLICATIONS

Hackh's Chemical Dictionary, "Intermetallic Compound", p. 351, McGraw-Hill Book Co., 1969.
R. Drewett, "Diffusion Coatings for the Protection of Iron and Steel", Anti Corrosion, Apr. 1969, pp. 11-16.

Primary Examiner—John J. Zimmerman
Attorney, Agent, or Firm—Lowe, Price, LeBlanc & Becker

[57] ABSTRACT

A metal-made carrier body, for carrying thereon an exhaust gas cleaning catalyst, comprises a honeycomb core structure composed of a sheet-like metal band and a corrugated metal band. As each of the metal bands, an inexpensive thin steel band which is plated with nickel and then with an aluminum coating and further processed by diffusive penetration treatment, is used. The metal-made carrier body is inexpensive and is excellently heat-resistant and corrosion-proof.

5 Claims, 3 Drawing Sheets

METAL-MADE CARRIER BODY FOR EXHAUST GAS CLEANING CATALYST AND PRODUCTION OF THE CARRIER BODY

This application is a continuation application of application Ser. No. 07/376,053, filed July 6, 1989, now abandoned.

BACKGROUND OF THE INVENTION

1. Field of the Invention

The present invention relates to a metal-made carrier body for carrying thereon an exhaust gas cleaning catalyst which is generally provided as an exhaust gas cleaning means at an intermediate point of an exhaust system of an automobile.

More particularly, the invention relates to a metal-made carrier body for carrying thereon an exhaust gas cleaning catalyst, which body is composed of constituent members which are inexpensive and are excellent in corrosion-resistivity and processability. The invention is also concerned with a process of producing such metal-made carrier body.

2. Description of the Related Art

Conventional metal-made carrier bodies of the above sort, which are adapted to carry an exhaust gas cleaning catalyst thereon, include those having a structure formed by laminating at least one sheet-like metal band and at least one corrugated metal band in layers (laminated type) or rolling them together (rolled type) into a multi-layered composite body with a view toward increasing the carrying area per unit volume, namely, with a view toward increasing as much as possible the effective area of contact between exhaust gas and the exhaust gas cleaning catalyst per unit volume and further reducing the weight of the metal-made carrier body to a maximum possible extent. As it is in the form of a honeycomb, this structure is hereinafter called "honeycomb core structure".

For example, a sheet-like metal band made of a heat-resistant thin steel sheet having a thickness of 0.1 mm or smaller and containing 20% of Cr and 5% of Al, and a corrugated band made from another thin steel sheet of the same type are superposed one over the other to have areas of contact therebetween. They are then rolled together spirally into a honeycomb core structure defining many network-patterned gas flow passages along a central axis thereof for allowing exhaust gas to pass therethrough. The honeycomb core structure is enclosed within a tubular metal casing which has a single-layer structure and opens in opposite ends thereof. The members of the honeycomb core structure, i.e., the sheet-like band and corrugated band are put together into a vibration-proof structure. Namely, the sheet-like band and corrugated band as well as the honeycomb core structure thus rolled and the metal casing are put together at the areas of contact therebetween by welding, brazing or the like.

For the preferable thin steel sheet to be used as a constituent member of the honeycomb core structure, a heat-resistant stainless steel of Fe-Cr(20%)-Al(5%), and another heat-resistant stainless steel additionally containing Co or rare earth elements such as Ce, Y, etc. in order to improve oxadation proofness (U.S. Pat. No. 4,66,169 and U.S. Pat. No. 4,414,023) have been proposed. When using as a constituent member of the honeycomb core structure, a thin sheet of such known steel should have a thickness of about 0.05 mm (50 $\mu$m) and a width of about 100 mm. If a stainless steel containing Al is used as a thin steel sheet, whiskers of $Al_2O_3$ would be deposited on the surface of the thin steel sheet due to heat-treatment. The whiskers serve to assist in fixing a wash coat for carrying thereon an exhaust gas cleaning catalyst (Pt, Pd, Rh, etc).

Yet if an inexpensive heat-resistant steel such as a low-carbon steel, a low-chrome steel, a low-nickel steel, etc. is used as a thin steel sheet constituting the honeycomb core structure, an adequately satisfactory honeycomb core structure cannot be obtained because of its processability and corrosion-resistivity.

More specific problems are as follows:

i) If a heat-resistant steel containig Cr of 15 to 25% and Al of 2 to 5% is used, an adequately rigid corrugated band can be achieved, and especially there would be no deformation of the wave shape of the honeycomb core structure during the production of honeycomb core structure. Namely, when producing the laminated-type honeycomb core structure from a sheet-like steel band and a corrugated steel band, and also when inserting the honeycomb core structure in a tubular metal casing and fixing the honeycomb core structure on the tubular metal casing. However, this steel is very hard, and therefore a steel sheet is difficult to roll into a thin metal band for a honeycomb core structure. To obtain a steel band of a desired thickness, rolling and tempering must be repeated, which is laborious and time-consuming. Therefore it is expensive to manufacture a honeycomb core structure.

ii) In an attempt to obtain an inexpensive honeycomb core structure, it has been proposed to use a low-carbon steel containing less than 0.15% of carbon. A honeycomb core structure formed from the low-carbon steel is aluminized (forming solid solutions or alloying by dipping a honeycomb core structure in a molten aluminum liquid to cause mutual diffusion between the surface of the steel and the molten aluminum liquid). The resulting honeycomb core structure has no problem in corrosion-resistivity in an exhaust gas at a high temperature of 800° to 900° C. and also in cost of production. However, with this low-carbon steel, only a low-rigidity corrugated steel band can be obtained so that the wave shape of the corrugated steel band would be deformed markably when forming a honeycomb core structure.

Because of this markable deformation of the wave shape of the corrugated steel band, a desired height of the wave is difficult to achieve and therefore the mesh size of network-patterned gas flow passages in the honeycomb core structure would be reduced to cause disadvantages such as a pressure loss (lowering the efficiency of an internal combustion engine). Further, the contact between the sheet-like steel band and the corrugated steel band would change from spot contact to plane contact so that the amount to which an exhaust gas catalyst is to be carried on the carrier body can be reduced to impair the exhaust gas cleaning ability.

iii) Another attempt is to use an inexpensive heat-resistant steel such as a low-chromium steel, e.g. SUS410L (Cr content: 11 to 13.5%). This steel has a rigidity lower than the steel of i) above and higher than the steel of ii) above. Therefore, when forming a honeycomb core structure, the wave shape of the corrugated steel band would be deformed to a greater extent, compared with the steel of ii) above. The most significant problem of this steel is that it is inadequate in heat-resistivity and also in corrosion proofness. The same thing can be said when a low-nickel steel such as SUS201 and SUS202 are used as a heat-resistant steel.

SUMMARY OF THE INVENTION

It is therefore an object of the present invention to provide a metal-made carrier body for carrying thereon an exhaust gas catalyst, which body is composed of inexpensive constituent steel bands so that the wave shape of a corrugated steel band can be retained especially when forming a honeycomb core structure, without using expensive heat-resistant steel (high-chromium or high-nickel).

According to a first aspect of the present invention, there is provided a metal-made carrier body for carrying thereon an exhaust gas cleaning catalyst, the carrier body having been formed by superposing a sheet-like metal band made of thin metal sheet and a corrugated band made from another thin metal sheet one over the other in a contiguous relation into a honeycomb core structure of a spiral or laminate form defining many network-patterned gas flow passages along the central axis thereof, enclosing as an optical step the honeycomb core structure within a tubular metal casing, and then fixing contacts between the sheet-like metal band and the corrugated band of the honeycomb core structure or contact between the honeycomb core structure and the tubular metal casing, wherein the sheet-like metal band made of the thin metal sheet and the corrugated band made from said another thin metal sheet have each been produced from a thin metal band obtained by applying a Ni-plating film to a starting thin steel band, forming an aluminum coating and then subjecting the resultant thin steel band to a diffusive penetration treatment.

According to a second aspect of the present invention, there is provided a method of producing a metal-made carrier body for carrying thereon an exhaust gas cleaning catalyst, said method comprising producing a producing a sheet-like band and a corrugated band individually from thin steel bands each of which has been obtained by applying a Ni-plating film to a starting thin steel band, forming an aluminum coating and then subjecting the resultant thin steel band to a diffusive penetration treatment, superposing the sheet-like band and the corrugated band one over the other in a contiguous relation into a honeycomb core structure of a spiral or laminate form defining many network-patterned gas flow passages along the central axis thereof, enclosing as an optional step the honeycomb core structure within a tubular metal casing, and then fixing contacts between the sheet-like band and the corrugated band of the honeycomb core structure or contacts between the honeycomb core structure and the tubular metal casing.

The above and other objects, features and additional advantages of the present invention will become manifest to those versed in the art upon making reference to the detailed description and the accompanying drawings in which embodiments incorporating the principles of the present invention are shown by way of illustrative example.

DETAILED DESCRIPTION

The present invention will now be described in detail with reference to the accompanying drawings.

Figure 1:
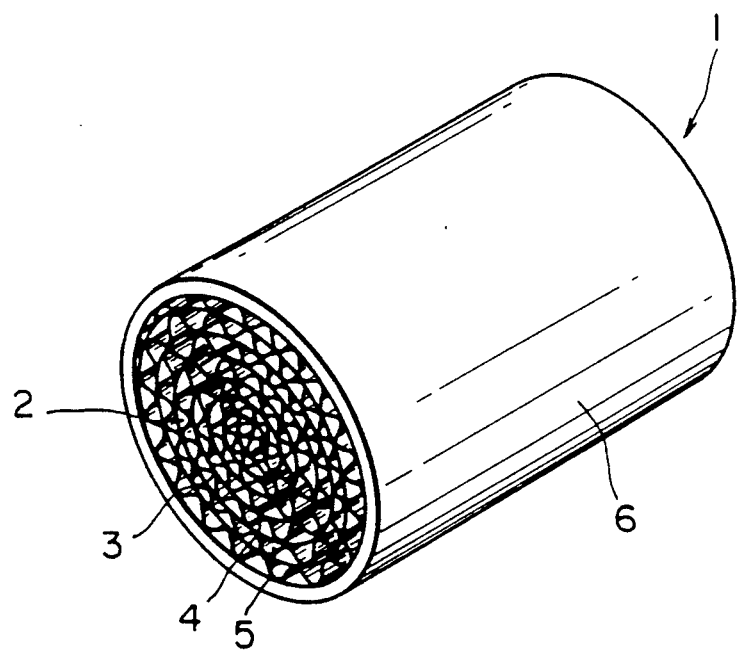
FIG. 1 is a perspective view of a rolled metal-made carrier body, for carrying thereon an exhaust gas cleaning catalyst, embodying the present invention.
Figure 2:
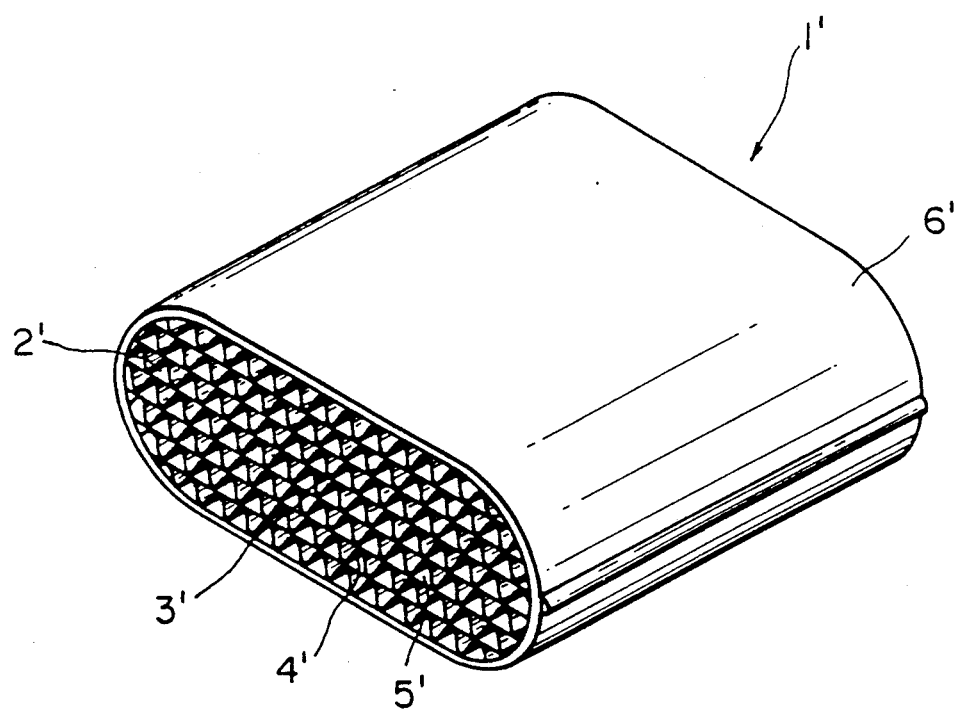
FIG. 2 is a perspective view of a laminated metal-made carrier body according to another embodiment of the invention.

FIGS. 1 and 2 are perspective views of a metal-made carrying thereon an exhaust gas cleaning catalyst. The metal-made carrier body 1, 1' is constructed in the following manner. A honeycomb core structure 2 of FIG. 1 is composed of a sheet-like metal band 3 and a corrugated metal band 4 rolled together into a spiral form (rolled type). A honeycomb core structure 2' of FIG. 2 is composed of a sheet-like metal band 3' and a corrugated metal band 4' are superposed one over the other (laminated type). In the metal-made carrier body 1, 1' of FIGS. 1 and 2, the honeycomb core structure 2, 2' is enclosed in a tubular metal casing 6, 6'; however, this tubular metal casing 6, 6' is not essential to the metal-made carrier body 1, 1' of the present invention. As is well known in the art, a ceramic-made carrier body for carrying thereon an exhaust gas cleaning catalyst is known; therefore, a metal casing may be omitted with a view to its noncompetitive cost, compared to the ceramic carrier body.

In the honeycomb core structure 2, 2', a sheet-like metal band 3, 3' made of a thin steel sheet and a corrugated metal band 4, 4' made from another thin steel sheet are superposed one over the other so as to contact each other and are shaped, by rolling or laminating, into a multilayered composite form defining many network-patterned gas flow passages 5, 5' along the central axis of the honeycomb core sturcture 2, 2'. The significant feature of the present invention resides in a metal strip or band for the above-mentioned thin steel band.

Namely, the first feature of the present invention is to use a steel which is easy to be rolled and inexpensive as a steel band (starting band) for the above-mentioned thin steel band. Thereby it is Possible to reduce the cost of rolling and tempering operation for minimizing the thickness of the steel band.

Figure 3:
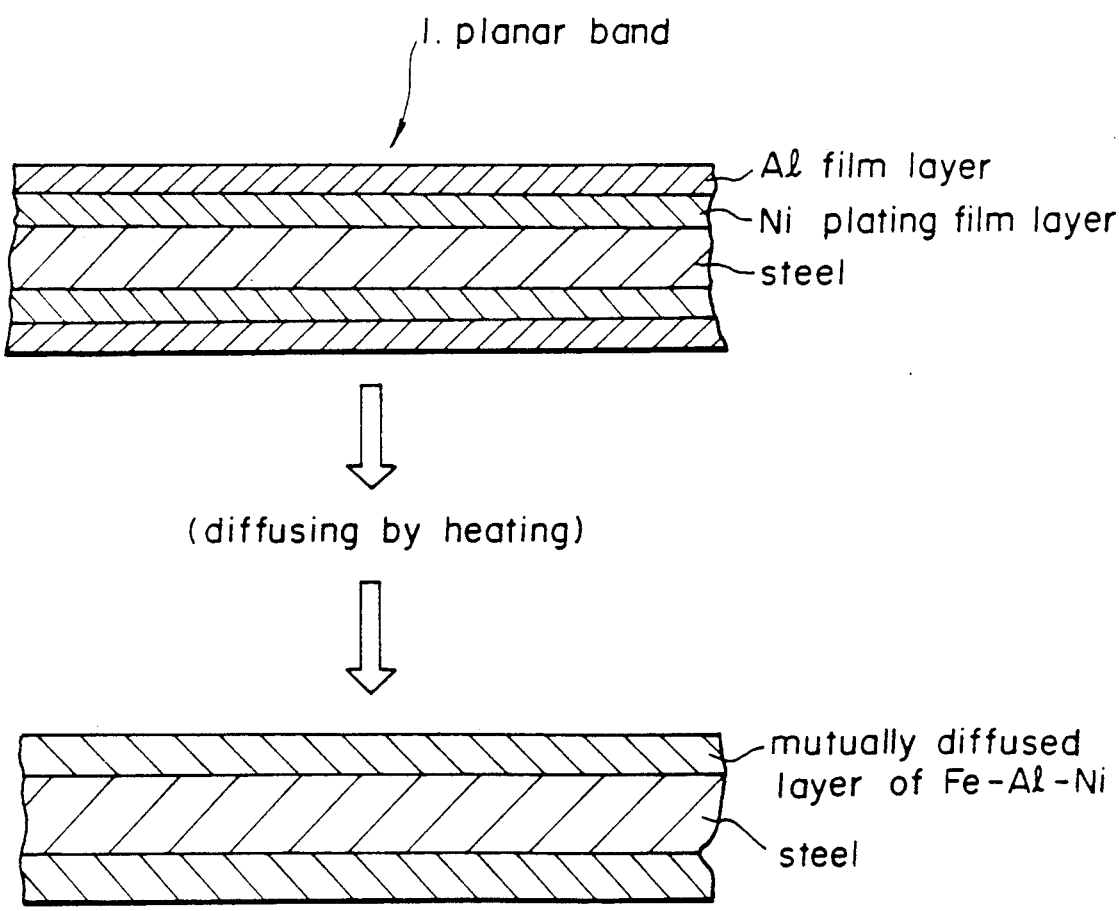
FIG. 3 is a view illustrating the manner in which a mutural diffusion layer such as of Fe-Al-Ni is formed on a sheet-like steel band to be used in the present invention.

A thin steel band rolled so as to have a thickness of 0.1 mm or less, preferably 0.02 to 0.05 mm is plated with nickel. Then, an aluminum film is formed over the nickel-plated thin steel band by dipping the steel band in a molten aluminum liquid or by mechanical plating, vaporation or electrical plating. The resultant steel band is subjected to a diffusive penetration treatment to thereby form on the surface of the thin steel band a heat-resistant, corrosion-proofing and high-rigidity alloyed layer such as of Fe-Al-Ni, or a solid-solution layer (hereinafter called "mutually diffused layer") in which these metal components occupy in a homogeneous crystalline form. This step of process is schematically shown in FIG. 3. As a matter of course, if the steel band is a low-chromium steel, a mutually diffused layer containing chromium.

As described above, it is possible to obtain from an inexpensive steel a thin steel band which is adequate in heat-resistivity, corrosion-proofness and hardness. Therefore, when a sheet-like metal band 3, 3' and a corrugated metal band 4, 4' are formed from this thin steel band and are then superposed one over the other to provide a honeycomb core structure 2, 2', the corrugated metal band 4, 4' has adequate rigidity so that its wave shape is free from any deformation. When the contacts between the sheet-like and corrugated metal bands are brazed, Ni in the Ni-plated layer serves also as a high-temperature brazing material.

In the present invention, as the steel which is inexpensive and easy to roll, a low carbon steel containing carbon of 0.15% or less, a low-chromium heat-resistant steel (a low-chromium steel such as SUS4101 containing Cr of 13.5%, compared to a high-chromium heat-resistant steel containing Cr of 15 to 25%), a low-nickel heat-resistant steel (austenitic stainless steel such as SUS 201, SUS 202, etc. containing nickel of 3 to 6%), etc. may be used.

Then, the resultant thin steel band is nickel-plated. For example, after the thin steel band (thickness: 0.05 mm) has been degreased and washed, the thin steel band is electrically plated with nickel, in a watt bath (for example, the bath components are nickel sulfate of 350 g/l, nickel chloride of 50 g/l and boric acid of 45 g/l; pH: 4 to 4.6, bath temperature: 50° to 60° C.). The thickness of a nickel-plating layer is preferably 5 to 15 μm so that the nickel-plating layer cooperates with an aluminum coating layer to improve the heat-resistivity, corrosion-proofness and rigidity of the thin steel band.

The forming of an aluminum film or coating to be done after nickel-plating process may be performed by a known method such as dipping in a molten aluminum bath, evaporation, electrical plating, mechanical plating, etc. The thickness of the aluminum film or coating is preferably 2 to 20 μm, compared to 5 to 15 μm of the nickel-plating layer.

After having been plated with nickel and covered with an aluminum film or coating, the thin steel band is processed by diffusive penetration treatment. This diffusive penetration treatment may be performed under a temperature condition such that metal components in the thin steel band, nickel-plating layer, and aluminum film can diffuse mutually. The condition under which the diffusive penetration treatment is to be performed depends on the respective thicknesses of the thin steel band (e.g. 0.02 to 0.05 mm), the nickel-plating layer (5 to 15 μm) and the aluminum coating layer (2 to 20 μm). Generally, however, the diffusive penetration treatment is continued at a temperature of at most 800° C. for tens seconds, practically 700° to 800° C. for at most 60 seconds, and preferably 720° to 760° C. for at most 30 seconds. Alternatively, the temperature condition for the diffusive penetration treatment may be set as desired, considering the thickness of the nickel-plating layer or aluminum film layer, the thickness of the oxidation film deposited on the surface of the nickel-plating layer, the kind of the thin steel band, etc.

preferably, diffusive penetration treatment, which tends to cause an aluminum film to be oxidized very soon, should be performed in a non-oxidative or reductive atmosphere in a heating furnace.

According to the present invention, the honeycomb core structure, the primary component of the metal-made carrier body, is composed of inexpensive steel constituent members (low-carbon steel, low-chrominum steel, low-nickel steel, etc.), but a mutually diffused layer which is hard, heat-resistant and corrosion-proof is formed on the surface of the individual thin steel member. Therefore, it is possible to obtain an inexpensive metal-made carrier body and to achieve the following additional advantageous results.

i) Since the sheet-like and corrugated metal bands constituting the honeycomb core structure have a high degree of rigidity, the wave shape of the corrugated metal band is free from any deformation (change in pitch and height) when forming the honeycomb core structure. Consequently, the cross-sectional size of the network-patterned gas flow passages would not become smaller when forming the honeycomb core structure, thus preventing not only flow resistance of exhaust gas from increasing, but also the efficiency of an internal combustion engine from lowering. Further, partly because the effective length of the corrugated metal band would not become shorter, and partly because the wave shape of the corrugated metal band would not be deformed (from sine-wave shape to rectangular shape by compression), the area on which an exhaust gas cleaning catalyst is to be carried would become smaller, thus preventing the exhaust gas cleaning performance from being impaired.

ii) Since the wave shape of the corrugated metal band is difficult to deform when forming the honeycomb core structure, it is unnecessary to reduce the speed of rolling the thin metal bands, thus causing an improved rate of production.

iii) Since a mutually diffused layer of three or four elements, such as Fe-Ni-Al or Fe-Cr-Ni-Al, is formed on the surface of the individual constituent metal band, a metal-made carrier body which is good in heat-resistivity and corrosion-proofness may be produced.

iv) Because Al of the Al alloyed layer and of Al film is deposited on the surface of the individual constituent metal band, the catalyst-carrying alumina layer and the aluminum whiskers can be formed stably. This is true because when the carrier body is treated with a wash coating solution before carrying an exhaust gas cleaning catalyst, the affinity between the deposited Al and the wash coating solution containing alumina as a principal component can be improved. Therefore, it is possible to stably carry a two-element catalyst containing platinum, which is expensive, or the like. Further, a reliable metal-made carrier body for carrying thereon an exhaust gas cleaning catalyst can be achieved.

The present invention will now be described in detail by the following examples. It should be noted that the present invention is not limited to these illustrated examples.

EXAMPLE 1

A Ni layer of 6 μm thickness was formed, by electrical nickel-plating, on opposite surfaces of a sheet-like band of a thin steel sheet made of a low-carbon steel (JIS G3141, SPCC) and having a thickness of 0.035 mm and a width of 74.5 mm. Then, the nickel-plated product was dipped in a mixed and dissolved chloride bath (composed of lithium chloride, potassium chloride, sodium chloride and sodium fluoride) to perform fluxing in order to remove an oxidized coating from the surface of the Ni-plated product.

After the fluxing treatment, the nickel-plated product was dipped in a molten aluminum bath and was pulled up. While the nickel-plated product was pulled upwardly, it was exposed to air blow and was wiped. As the oxidized coating was melt into the aluminum bath, the thickness of the Ni-plated layer was reduced to about 4 μm, and an Al layer having a thickness of 4 to 10 μm was formed on the reduced Ni layer.

Subsequently, in a non-oxidative or reductive atmosphere in a heating furnace, Ni and Al were diffused and penetrated on the surface of the sheet-like metal band.

As a result, a mutually diffused layer of Ni and Al was formed on the surface of the sheet-like metal band. The resultant sheet-like metal band was heat-resistant and corrosion-proofing and had a high degree of rigidity.

The sheet-like metal band was fed between forming gears to obtain a corrugated metal band in a wavy shape with longitudinal ridges spaced at pitches of 0.5 mm and having a height of 2.5 mm. Then the sheet-like band and the corrugated band were superposed one over the other to define areas of contact therebetween, whereupon these two bands were rolled together into a spiral form and were spot-welded at desired locations by an Ni brazing material to prevent them from loosening. As a result, a honeycomb core structure having an outer diameter of 90 mm was formed, during which time the wave shape of the corrugated metal band was not deformed. The honeycomb core structure may be enclosed in a tubular metal casing and may be brazed thereto according to need.

EXAMPLE 2

An Ni layer having a thickness of 5 μm was formed, by electrical nickel-plating, on opposite surfaces of a sheet-like metal band made of a thin steel band which is made of a low-chrominum steel (JlS G4305 SUS 4101, Cr content: 11 to 13%) and which has a thickness of 0.04 mm and a width of 50.8 mm. Then the Ni-plated sheet-like metal band was dipped in a mixed and melted chloride bath to perform fluxing treatment.

After the fluxing treatment, the Ni-Plated sheet-like metal band was dipped in a molten aluminum bath of a temperature of 720° C. and was pulled up. While the Ni-plated sheet-like band was pulled up, it was exposed to air blow and was wiped. As the oxidized coating was melt into the aluminum bath, the thickness of the Ni-plated layer was reduced to about 2 to 3 μm, and an Al layer having a thickness of 4 to 10 μm was formed on the reduced Ni layer. Subsequently, the diffusive penetration treatment same as Example 1 was performed to form a honeycomb core structure having outer diameter of 70 mm. While the sheet-like metal band and the corrugated metal band were rolled into a spiral form, the wave shape of the corrugated metal band would not be deformed. Thus a desired honeycomb core structure was obtained. Using this honeycomb core structure, a metal-made carrier body was produced in the same manner as Example 1.

What is claimed is:

1. A method of producing a metal-made carrier body for carrying thereon an exhaust gas cleaning catalyst, said method comprising producing a sheet band and a corrugated band individually from thin steel bands each of which has been obtained by first applying a Ni-plating film of a thickness of between about 5 to 15 μm to a starting thin steel band, then forming an aluminum coating thereon and then subjecting the resultant thin steel band to a diffusive penetration treatment to produce a mutually diffused layer consisting of metal components of said steel bands, said Ni-plating film, and said aluminum coating, superposing said produced sheet band and said produced corrugated band one over the other in a contiguous relation into a honeycomb core structure form defining many network-patterned gas flow passages along the central axis thereof, and then fixing contacts between the sheet band and the corrugated band of the honeycomb core structure.

2. A method according to claim 1, wherein the aluminum coating is formed by hot dipping using a molten aluminum bath, mechanical plating, vaporization or electroplating.

3. A method according to claim 1, wherein said honeycomb structure comprises a spiral form.

4. A method according to claim 1, wherein said honeycomb structure comprises a laminate form.

5. A method according to claim 1, wherein said honeycomb core structure is enclosed in a tubular metal casing and contacts between said honeycomb core structure and said tubular metal casing are fixed.

* * * * *